United States Patent
Herle et al.

(10) Patent No.: US 10,916,761 B2
(45) Date of Patent: Feb. 9, 2021

(54) LOW MELTING TEMPERATURE METAL PURIFICATION AND DEPOSITION

(71) Applicant: Applied Materials, Inc., Santa Clara, CA (US)

(72) Inventors: Subramanya P. Herle, Mountain View, CA (US); Bernard Frey, Livermore, CA (US); Dieter Haas, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 34 days.

(21) Appl. No.: 16/309,211

(22) PCT Filed: Jun. 8, 2017

(86) PCT No.: PCT/US2017/036570
§ 371 (c)(1),
(2) Date: Dec. 12, 2018

(87) PCT Pub. No.: WO2018/005038
PCT Pub. Date: Jan. 4, 2018

(65) Prior Publication Data
US 2019/0190000 A1    Jun. 20, 2019

Related U.S. Application Data

(60) Provisional application No. 62/357,461, filed on Jul. 1, 2016.

(51) Int. Cl.
*H01M 4/04* (2006.01)
*H01M 4/1395* (2010.01)
(Continued)

(52) U.S. Cl.
CPC ........... *H01M 4/0404* (2013.01); *B33Y 40/00* (2014.12); *H01G 11/84* (2013.01);
(Continued)

(58) Field of Classification Search
CPC .......................... H01M 4/0404; H01M 4/0483
See application file for complete search history.

(56) References Cited

U.S. PATENT DOCUMENTS 2,997,289 A    8/1961    Baker et al.
3,258,505 A    6/1966    Mill
(Continued)

FOREIGN PATENT DOCUMENTS

CN    20349642    3/2014
EP    1654775 B1    7/2010
(Continued)

OTHER PUBLICATIONS

Fuller et al (J. Electrochem. Soc. 143 L145, 1996).*
(Continued)

*Primary Examiner* — Olatunji A Godo
(74) *Attorney, Agent, or Firm* — Patterson + Sheridan LLP (57) ABSTRACT

Implementations described herein generally relate to low melting temperature metal or alloy metal deposition and processing. More particularly, the implementations described herein relate to methods and systems for low melting temperature metal or alloy metal deposition and processing for printed electronics and electrochemical devices. In yet another implementation, a method is provided. The method comprises exposing a molten metal source to a purification process to remove unwanted quantities of contaminants, delivering the filtered molten metal to a three dimensional printing device, and forming a metal film on a substrate by printing the filtered molten metal on the substrate. The purification process comprises delivering the molten metal to a filter assembly, wherein the filter
(Continued)

assembly includes at least one of: a skimmer device, a metal mesh filter, and a foam filter, and filtering the molten metal through the filter assembly.

20 Claims, 3 Drawing Sheets

(51) Int. Cl.
| | |
|---|---|
| *B33Y 40/00* | (2020.01) |
| *H01G 11/84* | (2013.01) |
| *H01M 4/134* | (2010.01) |
| *H01M 4/66* | (2006.01) |
| *B33Y 80/00* | (2015.01) |
| *B22F 3/105* | (2006.01) |
| *H01M 10/0562* | (2010.01) |
| *H01M 10/0563* | (2010.01) |

(52) U.S. Cl.
CPC ....... *H01M 4/0407* (2013.01); *H01M 4/0483* (2013.01); *H01M 4/134* (2013.01); *H01M 4/1395* (2013.01); *H01M 4/661* (2013.01); *B22F 3/1055* (2013.01); *B33Y 80/00* (2014.12); *H01M 10/0562* (2013.01); *H01M 10/0563* (2013.01); *Y02E 60/13* (2013.01); *Y02P 10/25* (2015.11)

(56) References Cited

U.S. PATENT DOCUMENTS

| | | | |
|---|---|---|---|
| 3,901,811 A | 8/1975 | Finch | |
| 4,007,923 A | 2/1977 | Chia | |
| 4,274,834 A | 6/1981 | Brown et al. | |
| 4,528,032 A | 7/1985 | Keough et al. | |
| 4,721,525 A | 1/1988 | Royer | |
| 5,169,446 A | 12/1992 | Koksbang et al. | |
| 5,350,645 A | 9/1994 | Lake et al. | |
| 5,624,468 A | 4/1997 | Lake | |
| 5,747,103 A | 5/1998 | Mitchell, Jr. et al. | |
| 6,402,795 B1 * | 6/2002 | Chu | H01M 4/12 29/623.5 |
| 6,663,776 B2 * | 12/2003 | Hoffman | B01D 39/2093 210/503 |
| 7,320,845 B2 | 1/2008 | Zucker | |
| 7,923,400 B2 | 4/2011 | Saito et al. | |
| 8,003,244 B2 | 8/2011 | Hahn | |
| 2003/0228520 A1 * | 12/2003 | Kaun | H01M 10/399 429/247 |
| 2010/0099026 A1 | 4/2010 | Choi et al. | |
| 2011/0229760 A1 * | 9/2011 | Hidaka | H01M 4/621 429/217 |
| 2011/0240245 A1 | 10/2011 | Schlienger et al. | |
| 2012/0270114 A1 | 10/2012 | Reynolds et al. | |
| 2013/0011735 A1 | 1/2013 | Nelson et al. | |
| 2013/0136973 A1 | 5/2013 | Shenoy | |
| 2013/0157105 A1 | 6/2013 | Picard et al. | |
| 2014/0315084 A1 | 10/2014 | Liu et al. | |

FOREIGN PATENT DOCUMENTS

| | | |
|---|---|---|
| JP | 2008-069449 A | 3/2008 |
| JP | 2013062242 A | 4/2013 |
| KR | 10-1611566 | 4/2016 |
| WO | 2001080338 A1 | 10/2001 |
| WO | 2011008744 A1 | 1/2011 |

OTHER PUBLICATIONS

Arenas et al. (ECS Journal of Solid State Science and Technology, 4 (4) p. 3080-p. 3085 (2015)).*
International Search Report and Written Opinion dated Sep. 12, 2017 for Application No. PCT/US2017/036570.
Tan, W. S., "Proof of concept: Application of induction heating to 3D print low melting point metal alloy", The UNSW Canberra at ADFA Journal of Undergraduate Engineering Research, 2015, Final Project Summary Report, vol. 8, No. 1.
Ferrari, Stefania et al., "Latest advances in the manufacturing of 3D rechargeable lithium microbatteries", Journal of Power Sources, 2015, vol. 286, pp. 25-46.
E. E. Hoffman, "The Solubility of Nitrogen and Oxygen in Lithium and Methods of Lithium Purification", Oak Ridge National Laboratory, pp. 1-27.
Office Action for Korean Application No. 10-2019-7003423 (APPM/ 023744KR01) dated Jul. 31, 2020.

* cited by examiner

LOW MELTING TEMPERATURE METAL PURIFICATION AND DEPOSITION

BACKGROUND

Field

Implementations described herein generally relate to low melting temperature metal or metal alloy deposition and processing. More particularly, the implementations described herein relate to methods and systems for low melting temperature metal or alloy metal deposition and processing for printed electronics and energy storage devices.

Description of the Related Art

Printed electronics are increasing in importance as societal demand for flexible devices and various IoT (internet of things) applications increases. For example, printing of circuits on flexible substrate can help in packaging of sensors. Rechargeable electrochemical devices are also becoming increasingly important for many fields of everyday life. High-capacity energy storage devices, such as super-capacitors and lithium-ion (Li-ion) batteries, are used in a growing number of applications, including portable electronics, medical, transportation, grid-connected large energy storage, renewable energy storage, and uninterruptible power supply (UPS). In each of these applications, the charge time and capacity of energy storage devices are important parameters. In addition, the size, weight, and/or expense of such energy storage devices can be significant limitations. Traditional lead-sulfuric acid batteries often lack the capacitance and are often inadequately cycleable for these growing applications. Advanced lead carbon batteries have become prominent candidates for start-stop vehicle technology.

Typically, lithium batteries do not contain any metallic lithium for safety reasons but instead use graphitic material as the anode. However, the use of graphite, which in the charged state can be charged up to the limit composition $LiC_6$, results in a much lower capacitance, in comparison with the use of metallic lithium. Currently, the industry is moving away from graphitic-based anodes to silicon-blended graphite to increase energy cell density. However, silicon blended graphite anodes suffer from first cycle capacity loss, in comparison with metallic lithium. Thus, there is a need for lithium metal deposition techniques to improve capacitance and reduce first cycle capacity loss. However, lithium metal faces several device integration challenges.

Lithium is an alkali metal. Like the heavy element homologs of the first main group, lithium is characterized by a strong reactivity with a variety of substances. Lithium reacts violently with water, alcohols and other substances that contain protic hydrogen, often resulting in ignition. Lithium is unstable in air and reacts with oxygen, nitrogen and carbon dioxide. Normally, lithium is handled under an inert gas atmosphere (noble gases such as argon) and the strong reactivity of lithium requires that other processing operations also be performed in an inert gas atmosphere. As a result, lithium provides several challenges when it comes to deposition, processing, storage, and transportation.

Therefore, there is a need for methods and systems for the deposition and processing of low melting temperature metal or metal alloy features for printed electronics and energy storage devices.

SUMMARY

Implementations described herein generally relate to low melting temperature metal or metal alloy deposition and processing. More particularly, the implementations described herein relate to methods and systems for low melting temperature metal or alloy metal deposition and processing for printed electronics and energy storage devices. In one implementation, a method of forming an electrode is provided. The method comprises exposing a molten alkali metal source to a purification process to remove unwanted quantities of contaminants, delivering the filtered molten alkali metal to a three dimensional printing device, and forming a alkali metal film on a conductive current collector by depositing the filtered molten alkali metal on the conductive current collector. The purification process comprises delivering the molten alkali metal to a filter assembly, wherein the filtering assembly includes at least one of: a skimmer device, a metal mesh filter, and a foam filter and filtering the molten alkali metal through the filter assembly.

In another implementation, a method of forming an energy storage device is provided. The method comprises exposing a molten lithium source to a purification process to remove unwanted quantities of contaminants. The molten lithium is delivered to and filtered through a filter assembly. The filter assembly comprises a skimmer device, a metal mesh filter, or a foam filter. The method further comprises delivering the filtered molten lithium to a three dimensional printing device. The method further comprises forming a lithium metal film on a substrate by printing the filtered molten lithium on the substrate. The substrate is at least one of a polymeric separator film or a conductive current collector.

In yet another implementation, a method of forming an electrode is provided. The method comprises forming a barrier film on an anode current collector, forming a wetting film on the barrier film, and forming a lithium metal film on the wetting film. The barrier film is selected from titanium (Ti), molybdenum (Mo), tungsten (W), zirconium (Zr), hafnium (Hf), niobium (Nb), tantalum (Ta) and combinations thereof. The wetting film is selected from silicon (Si), tin (Sn), aluminum (Al), silicon oxide, tin oxide, aluminum oxide, or combinations thereof.

In yet another implementation, an anode electrode is provided. The anode electrode comprises an anode current collector, a barrier film formed on the anode current collector, a wetting film formed on the barrier film, and a lithium metal film formed on the wetting film. The barrier film is selected from titanium (Ti), molybdenum (Mo), tungsten (W), zirconium (Zr), hafnium (Hf), niobium (Nb), tantalum (Ta) and combinations thereof. The wetting film is selected from silicon (Si), tin (Sn), aluminum (Al), silicon oxide, tin oxide, aluminum oxide and combinations thereof.

In yet another implementation, a method is provided. The method comprises exposing a molten metal source to a purification process to remove unwanted quantities of contaminants, delivering the filtered molten metal to a three dimensional printing device, and forming a metal film on a substrate by printing the filtered molten metal on the substrate. The purification process comprises delivering the molten metal to a filter assembly, wherein the filter assembly includes at least one of: a skimmer device, a metal mesh filter, and a foam filter and filtering the molten metal through the filter assembly.

In yet another implementation, a method is provided. The method comprises exposing a molten metal source to a purification process to remove unwanted quantities of contaminants, delivering the filtered molten metal to a three dimensional depositing device, and forming a metal film on a substrate. The purification process comprises delivering the molten metal to a filter assembly, wherein the filter assembly includes at least one of: a skimmer device, a metal mesh filter, and a foam filter and filtering the molten metal through the filter assembly.

In yet another implementation, a method is provided. The method comprises forming a barrier film on a substrate, forming a wetting film on the barrier film, and forming a metal film on the wetting film. The metal film has a melting temperature of 1,000 degrees Celsius or less. The barrier film is selected from titanium (Ti), molybdenum (Mo), tungsten (W), zirconium (Zr), hafnium (Hf), niobium (Nb), tantalum (Ta) and combinations thereof. The wetting film is selected from silicon (Si), tin (Sn), aluminum (Al), germanium (Ge), antimony (Sb), lead (Pb), bismuth (Bi), gallium (Ga), indium (In), zinc (Zn), cadmium (Cd), magnesium (Mg), oxides thereof, nitrides thereof, or combinations thereof.

In yet another implementation, a method of forming an energy storage device is provided. The method comprises forming a barrier film on a conductive current collector. The barrier film is selected from titanium (Ti), molybdenum (Mo), tungsten (W), zirconium (Zr), hafnium (Hf), niobium (Nb), tantalum (Ta) and combinations thereof. The method comprises forming a wetting film on the barrier film. The wetting film is selected from silicon (Si), tin (Sn), aluminum (Al), germanium (Ge), antimony (Sb), lead (Pb), bismuth (Bi), gallium (Ga), indium (In), zinc (Zn), cadmium (Cd), magnesium (Mg), oxides thereof, nitrides thereof, or combinations thereof. The method further comprises exposing a molten lithium source to a purification process to remove unwanted quantities of contaminants. The method further comprises delivering the purified molten lithium to a three dimensional printing device. The method further comprises forming the lithium metal film on the wetting film by printing the purified molten lithium on the wetting film.

In yet another implementation, a method of forming an energy storage device is provided. The method comprises exposing a molten metal source to a purification process to remove unwanted quantities of contaminants. The method further comprises delivering the molten metal to a filter assembly and filtering the molten metal through the filter assembly. The filter assembly comprises at least one of a skimmer device, a metal mesh filter, and a foam filter. The method further comprises delivering the filtered molten metal to a three dimensional printing device. The method further comprises forming a metal film on a substrate by printing the filtered molten metal on the substrate. The substrate is at least one of a polymeric separator film or a conductive current collector.

In yet another implementation, an anode electrode is provided. The anode electrode comprises an anode current collector, a barrier film formed on the anode current collector, a wetting film formed on the barrier film, and a lithium metal film formed on the wetting film. The barrier film is titanium (Ti), molybdenum (Mo), tungsten (W), zirconium (Zr), hafnium (Hf), niobium (Nb), tantalum (Ta), or combinations thereof. The wetting film is silicon (Si), tin (Sn), aluminum (Al), germanium (Ge), antimony (Sb), lead (Pb), bismuth (Bi), gallium (Ga), indium (In), zinc (Zn), cadmium (Cd), magnesium (Mg), oxides thereof, nitrides thereof, or combinations thereof.

In yet another implementation, a method of forming an energy storage device is provided. The method comprises forming a barrier film on a substrate, forming a wetting film on the barrier film, and forming a metal film on the wetting film. The metal film has a melting temperature of 1,000 degrees Celsius or less. The barrier film is selected from titanium (Ti), molybdenum (Mo), tungsten (W), zirconium (Zr), hafnium (Hf), niobium (Nb), tantalum (Ta), and combinations thereof. The wetting film is selected from silicon (Si), tin (Sn), aluminum (Al), germanium (Ge), antimony (Sb), lead (Pb), bismuth (Bi), gallium (Ga), indium (In), zinc (Zn), cadmium (Cd), magnesium (Mg), oxides thereof, nitrides thereof, or combinations thereof.

BRIEF DESCRIPTION OF THE DRAWINGS

So that the manner in which the above-recited features of the present disclosure can be understood in detail, a more particular description of the implementations, briefly summarized above, may be had by reference to implementations, some of which are illustrated in the appended drawings. It is to be noted, however, that the appended drawings illustrate only typical implementations of this disclosure and are therefore not to be considered limiting of its scope, for the disclosure may admit to other equally effective implementations.

To facilitate understanding, identical reference numerals have been used, where possible, to designate identical elements that are common to the figures. It is contemplated that elements and features of one implementation may be beneficially incorporated in other implementations without further recitation.

DETAILED DESCRIPTION

The following disclosure describes printed electronics and energy storage devices (e.g., anode electrodes, high performance electrochemical cells, capacitors and batteries) including the aforementioned anode electrodes, and methods for fabricating the same. Certain details are set forth in the following description and in FIGS. 1-3 to provide a thorough understanding of various implementations of the disclosure. Other details describing well-known structures and systems often associated with printed electronics and energy storage devices are not set forth in the following disclosure to avoid unnecessarily obscuring the description of the various implementations.

Many of the details, dimensions, angles and other features shown in the Figures are merely illustrative of particular implementations. Accordingly, other implementations can have other details, components, dimensions, angles and features without departing from the spirit or scope of the present disclosure. In addition, further implementations of the disclosure can be practiced without several of the details described below.

Implementations described herein will be described below in reference to a roll-to-roll coating system, such as TopMet® roll-to-roll coating system, SMARTWEB® roll-to-roll sputter system, TOPBEAM® roll-to-roll coating system, SOFT LINE® screen printing system, all of which are available from Applied Materials, Inc. of Santa Clara, Calif. Other tools capable of performing sputtering processes and/or high rate evaporation processes may also be adapted to benefit from the implementations described herein. In addition, any system enabling high rate evaporation processes and or sputtering processes described herein can be used to advantage. The apparatus description described herein is illustrative and should not be construed or interpreted as limiting the scope of the implementations described herein. It should also be understood that although described as a reel-to-reel process, the implementations described herein may also be performed on discrete substrates.

As used herein the terms "additive manufacturing process" and "three-dimensional '3D' printing" may include, but are not limited to processes, such as, a polyjet deposition process, inkjet printing process, fused deposition modeling process, binder jetting process, powder bed fusion process, selective laser sintering process, stereolithographic process, digital light processing, sheet lamination process, directed energy deposition process, patterned coating, block printing, intaglio printing, screen printing, painting or other similar 3D deposition process.

Printed electronics are increasing in importance as societal demand for flexible devices and various IoT (internet of things) applications increases. For example, printing of circuits on flexible substrate can help in packaging of sensors. Typically, colloidal paint is dispensed to form a circuit and resistance of printed features. It is believed that direct printing of metal features using the implementations described herein will reduce/eliminate pores formed between metal particles and enhance electronic conductivity. It is further believed that direct printing of metal and/or metal alloy features from low temperature metals or alloys using the implementations described herein can improve quality of the circuit significantly. According to the implementations described herein, the direct deposition of low melting metal or alloys can be done either in vacuum conditions or suitable atmospheric ambient. Some of the typical examples of low melting elements (e.g., below 700 degree Celsius; below 800 degree Celsius; or below 1,000 degree Celsius) that may be deposited using the implementations described herein are alkali metal (e.g., lithium and sodium), magnesium, zinc, cadmium, aluminum, gallium, indium, thallium, tin, lead, antimony, bismuth, and tellurium. In addition to these elements, alkali earth metals and silver melt below 1,000 degree Celsius. In one implementation, the low melting temperature metal is selected from the group consisting of alkali metals, magnesium, zinc, cadmium, aluminum, gallium, indium, thallium, tin, lead, antimony, bismuth, and tellurium, alkali earth metals, silver, and combinations thereof.

Aluminum and Silver paints are used in the industry for various applications including solar cell manufacturing. In lead acid battery applications, lead paste is used to fabricate the lead electrode. These are relatively low melting elements and can be deposited using the implementations described herein.

The current generation of energy storage devices (e.g., Li-ion batteries) use graphite based negative electrode deposited on thin copper substrates (e.g., ~8 μm). A new negative electrode with high energy density is needed to improve energy density of the energy storage device. Alkali metal anodes (e.g., lithium metal anodes) are believed to provide the desired high energy density. However, current alkali metal deposition processes including extrusion and evaporation suffer from several deficiencies. For example, extruding alkali metal to high-purity single digit micron thickness suitable for negative electrodes is difficult if not impossible. Lithium deposition by evaporation using powder lithium sources present several safety related issues. Alkali metal coating, printing, and painting are promising technology options. Alkali metal printing provides high material utilization and is compatible with both existing roll-to-roll and screen-printing deposition technology. Thus, there is no practical solution for high throughput high purity alkali metal deposition for pre-lithiation and alkali metal anodes.

In one implementation of the present disclosure, a metal film is deposited on a conductive substrate (e.g., a copper substrate) with an optional barrier film and an optional lithium-bonding film. The metal film typically includes at least one of the low temperature melting metals described herein. The metal film may be deposited using, for example, a 3D printing process (e.g., a 3D metal printing process, metal pattern coating process, or metal painting process). The films may be deposited using atmospheric or vacuum-based web tools and/or screen printing tools. In some implementations, printing metal on thin substrate such as copper current collectors needs to have suitable wetting film and a barrier film. In some implementations, the metal film has a protective film (e.g., a polymer or polymer electrolyte) formed thereon for winding and handling purposes. From a device perspective, a protective coating may enhance the device functionality such as thermal, electrical or ionic conductivity, good response to electromagnetic radiation, a marker for spectroscopic, optical or X-ray investigations, or can be used for embedded security features.

In some implementations, the barrier film can be made of metals such as titanium (Ti), molybdenum (Mo), tungsten (W), zirconium (Zr), hafnium (Hf), niobium (Nb), tantalum (Ta) and combinations thereof. The barrier film can also be binary and ternary transition metal carbide or nitrides consisting of elements from early transition metal and late transition metal. In some cases, the early transition metal can be elements from lanthanides. In one implementation, the barrier film is a titanium film. Clad materials also offer superior mechanical stability and some are compatible with the electrochemical stability.

In some implementations, the wetting film can be made of material that can bond directly with lithium and/or have high contact angle. For example, Si, Sn, Al all form alloys with lithium and oxides (e.g., $SiO_x$, $SnO_x$ and $AlO_x$ (x vary from 0 to a number to match highest oxidation state for charge balance)). In one implementation, the wetting film is a silicon-containing film. In another example, the metal contact angle (e.g., lithium contact angle) decreases on stainless steel with temperature.

Figure 1A:
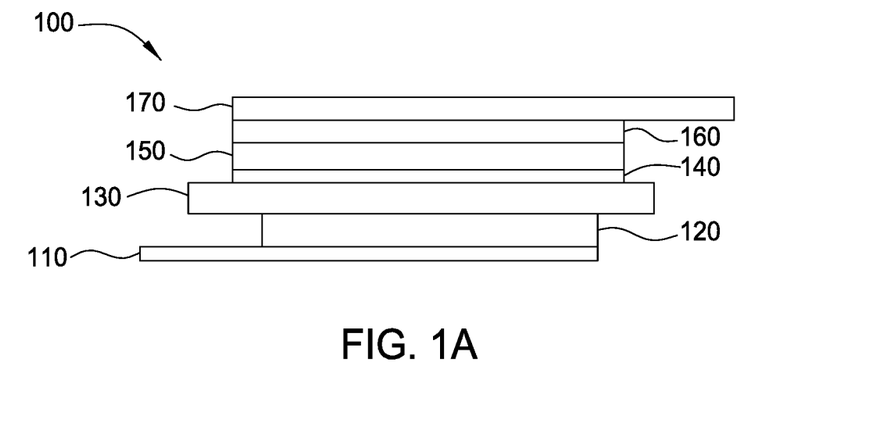
FIG. 1A illustrates a cross-sectional view of one implementation of an energy storage device incorporating an anode electrode structure formed according to implementations described herein.

FIG. 1A illustrates a cross-sectional view of one implementation of an energy storage device 100 incorporating an anode structure formed according to implementations described herein. In some implementations, the energy storage device 100 is a rechargeable battery cell. In some implementations, the energy storage device 100 is a capacitor (e.g., supercapacitor or ultracapacitor). In some implementations, the energy storage device 100 is combined with other cells to form a rechargeable battery or capacitor. Energy storage device 100 has a cathode current collector 110, a cathode film 120, a separator film 130, a low melting temperature metal film 140 (e.g., lithium metal film), an optional wetting film 150, an optional barrier film 160, and an anode current collector 170. Note in FIG. 1A that the current collectors and separator film are shown to extend beyond the stack, although it is not necessary for the current collectors and/or separator film to extend beyond the stack, the portions extending beyond the stack may be used as tabs.

The current collectors 110, 170, on cathode film 120 and low melting temperature metal film 140, respectively, can be identical or different electronic conductors. Examples of metals that the current collectors 110, 170 may be comprised of include aluminum (Al), copper (Cu), zinc (Zn), nickel (Ni), cobalt (Co), tin (Sn), silicon (Si), manganese (Mn), magnesium (Mg), clad materials, alloys thereof, and combinations thereof. In one implementation, at least one of the current collectors 110, 170 is perforated. Furthermore, current collectors may be of any form factor (e.g., metallic foil, sheet, or plate), shape and micro/macro structure. Generally, in prismatic cells, tabs are formed of the same material as the current collector and may be formed during fabrication of the stack, or added later. In some implementations, all components except current collectors 110 and 170 contain lithium ion electrolytes. In one implementation, the cathode current collector 110 is aluminum. In one implementation, the cathode current collector 110 has a thickness from about 2 µm to about 20 µm. In one implementation, the anode current collector 170 is copper. In one implementation, the anode current collector 170 has a thickness from about 10 µm to about 20 µm.

The cathode film 120 or cathode may be any material compatible with the anode and may include an intercalation compound, an insertion compound, or an electrochemically active polymer. Suitable intercalation materials include, for example, lithium-containing metal oxides, $MoS_2$, $FeS_2$, $MnO_2$, $TiS_2$, $NbSe_3$, $LiCoO_2$, $LiNiO_2$, $LiMnO_2$, $LiMn_2O_4$, $V_6O_{13}$ and $V_2O_5$. Suitable polymers include, for example, polyacetylene, polypyrrole, polyaniline, and polythiopene. The cathode film 120 or cathode may be made from a layered oxide, such as lithium cobalt oxide, an olivine, such as lithium iron phosphate, or a spinel, such as lithium manganese oxide. Exemplary lithium-containing oxides may be layered, such as lithium cobalt oxide ($LiCoO_2$), or mixed metal oxides, such as $LiNi_xCo_{1-2x}MnO_2$, $LiNiMnCoO_2$ ("NMC"), $LiNi_{0.5}Mn_{1.5}O_4$, $Li(Ni_{0.8}Co_{0.15}Al_{0.05})O_2$, $LiMn_2O_4$, and doped lithium rich layered-layered materials, wherein x is zero or a non-zero number. Exemplary phosphates may be iron olivine ($LiFePO_4$) and it is variants (such as $LiFe_{(1-x)}Mg_xPO_4$), $LiMoPO_4$, $LiCoPO_4$, $LiNiPO_4$, $Li_3V_2(PO_4)_3$, $LiVOPO_4$, $LiMP_2O_7$, or $LiFe_{1.5}P_2O_7$, wherein x is zero or a non-zero number. Exemplary fluorophosphates may be $LiVPO_4F$, $LiAlPO_4F$, $Li_5V(PO_4)_2F_2$, $Li_5Cr(PO_4)_2F_2$, $Li_2CoPO_4F$, or $Li_2NiPO_4F$. Exemplary silicates may be $Li_2FeSiO_4$, $Li_2MnSiO_4$, or $Li_2VOSiO_4$. An exemplary non-lithium compound is $Na_5V_2(PO_4)_2F_3$. The cathode film 120 may be formed by physical or chemical thin-film techniques, such as sputtering, electron beam evaporation, chemical vapor deposition (CVD), etc. In one implementation, the cathode film 120 has a thickness from about 10 µm to about 100 µm (e.g., from about 30 µm to about 80 µm; or from about 40 µm to about 60 µm). In one implementation, the cathode film 120 is a $LiCoO_2$ film. In some implementations, where the energy storage device is an electrochemical capacitor, high-surface area carbon is used as an electrode.

The separator film 130 comprises a porous (e.g., microporous) polymeric substrate capable of conducting ions (e.g., a separator film) with pores. In some implementations, the porous polymeric substrate itself does not need to be ion conducting, however, once filled with electrolyte (liquid, gel, solid, combination etc.), the combination of porous substrate and electrolyte is ion conducting. In one implementation, the porous polymeric substrate is a multi-layer polymeric substrate. In one implementation, the pores are micropores. In some implementations, the porous polymeric substrate consists of any commercially available polymeric microporous membranes (e.g., single or multi-ply), for example, those products produced by produced by Polypore (Celgard Inc., of Charlotte, N.C.), Toray Tonen (Battery separator film (BSF)), SK Energy (Li-ion battery separator (LiBS), Evonik industries (SEPARION® ceramic separator membrane), Asahi Kasei (Hipore™ polyolefin flat film membrane), DuPont (Energain®), etc. In some implementations, where the separator film 130 is a porous polymeric substrate, the porous polymeric substrate has a porosity in the range of 20 to 80% (e.g., in the range of 28 to 60%). In some implementations, where the separator film 130 is a porous polymeric substrate, the porous polymeric substrate has an average pore size in the range of 0.02 to 5 microns (e.g., 0.08 to 2 microns). In some implementations, the porous polymeric substrate has a Gurley Number in the range of 15 to 150 seconds (Gurley Number refers to the time it takes for 10 cc of air at 12.2 inches of water to pass through one square inch of membrane). In some implementations, the porous polymeric substrate is polyolefinic. Exemplary polyolefins include polypropylene, polyethylene, or combinations thereof. Metal deposition on the separator can be used for electrochemical capacitor to enhance the device performance.

In some implementations, an optional barrier film 160 is formed on the anode current collector 170. In some implementations, the barrier film can be made of metals such as titanium (Ti), molybdenum (Mo), tungsten (W), zirconium (Zr), hafnium (Hf), niobium (Nb), tantalum (Ta) and combinations thereof. The barrier film can also be binary and ternary transition metal carbide or nitrides consisting of elements from early transition metal and late transition metal. In some implementations, the early transition metal can be elements from lanthanides. In one implementation, the barrier film 160 has a thickness from about 1 nm to about 200 nm (e.g., from about 5 nm to about 100 nm; from about 10 nm to about 50 nm; or from about 10 nm to about 20 nm). In one implementation, the wetting film 150 is a silicon or silicon-containing film. In one implementation, the barrier film 160 is a titanium film.

In some implementations, an optional wetting film 150 is formed on the anode current collector of the barrier film 160. In some implementations, the wetting film 150 can be made of material that can bond directly with lithium or have high contact angle. For example, Si, Sn, Al all form alloys with lithium and oxides (e.g., $SiO_x$, $SnO_x$ and $AlO_x$ (x vary from 0 to a number to match highest oxidation state for charge balance)). In one implementation, the wetting film is selected from the group of silicon (Si), tin (Sn), aluminum (Al), germanium (Ge), antimony (Sb), lead (Pb), bismuth (Bi), gallium (Ga), indium (In), zinc (Zn), cadmium (Cd), magnesium (Mg), oxides thereof, nitrides thereof, or combinations thereof. In one implementation, the wetting film is selected from the group of silicon (Si), tin (Sn), aluminum (Al), silicon oxide, tin oxide, or combinations thereof. In one implementation, the wetting film 150 has a thickness from about 1 nm to about 200 nm (e.g., from about 5 nm to about 100 nm; from about 10 nm to about 50 nm; or from about 20 nm to about 140 nm). In one implementation, the wetting film 150 is a silicon or silicon-containing film.

In some implementations where the optional wetting film 150 is present, the low melting temperature metal film 140 is formed on the optional wetting film 150. In some implementations, the low melting temperature metal film 140 is formed directly on the anode current collector 170. The low melting temperature metal film 140 or anode may be constructed from a lithium metal, lithium metal foil or a lithium alloy foil (e.g. lithium aluminum alloys), or a mixture of a lithium metal and/or lithium alloy and materials such as carbon (e.g. coke, graphite), nickel, copper, tin, indium, silicon, oxides thereof, or combinations thereof. The low melting temperature metal film 140 typically comprises intercalation compounds containing lithium or insertion compounds containing lithium. The low melting temperature metal film 140 may be deposited using the printing methods described herein. In some implementations, the low melting temperature metal film 140 may be formed by physical or chemical thin-film techniques, such as sputtering, electron beam evaporation, chemical vapor deposition (CVD), three-dimensional printing etc. In one implementation, the low melting temperature metal film 140 has a thickness from about 1 μm to about 50 μm (e.g., from about 3 μm to about 40 μm; from about 3 μm to about 20 μm; or from about 20 μm to about 40 μm).

Electrolytes infused in cell components 120, 130, 140, 150 and 160 can be comprised of a liquid/gel or a solid polymer and may be different in each. In some implementations, the electrolyte primarily includes a salt and a medium (e.g., in a liquid electrolyte, the medium may be referred to as a solvent; in a gel electrolyte, the medium may be a polymer matrix). The salt may be a lithium salt. The lithium salt may include, for example, $LiPF_6$, $LiAsF_6$, $LiCF_3SO_3$, $LiN(CF_3SO_3)_3$, $LiBF_6$, and $LiClO_4$, lithium bis-trifluoromethanesulfonimidate (e.g., LiTFSI), BETTE electrolyte (commercially available from 3M Corp. of Minneapolis, Minn.) and combinations thereof. Solvents may include, for example, ethylene carbonate (EC), propylene carbonate (PC), EC/PC, 2-MeTHF(2-methyltetrahydrofuran)/EC/PC, EC/DMC (dimethyl carbonate), EC/DME (dimethyl ethane), EC/DEC (diethyl carbonate), EC/EMC (ethyl methyl carbonate), EC/EMC/DMC/DEC, EC/EMC/DMC/DEC/PE, PC/DME, and DME/PC. Polymer matrices may include, for example, PVDF (polyvinylidene fluoride), PVDF:THF (PVDF:tetrahydrofuran), PVDF:CTFE (PVDF:chlorotrifluoroethylene) PAN (polyacrylonitrile), and PEO (polyethylene oxide).

Figure 1B:
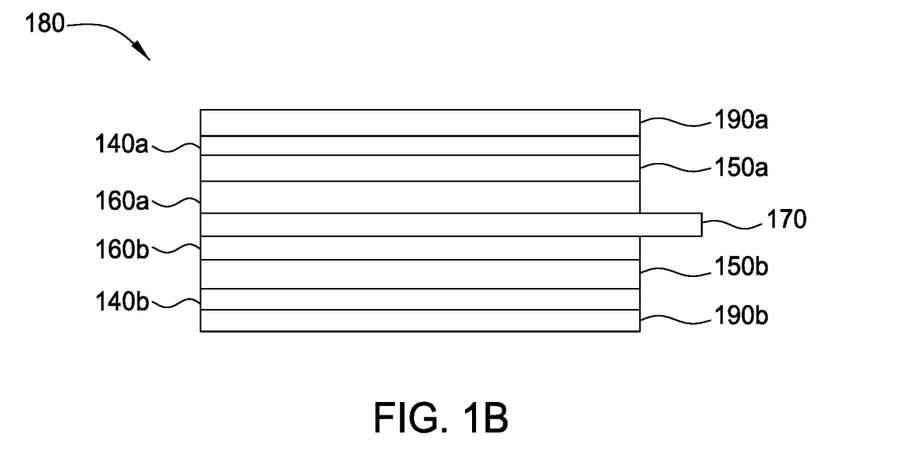
FIG. 1B illustrates a cross-sectional view of an anode electrode structure formed according to implementations described herein.

FIG. 1B illustrates a cross-sectional view of anode electrode structure 180 formed according to implementations described herein. The anode electrode structure 180 may be combined with a cathode electrode structure to form an energy storage device. The anode electrode structure 180 includes an anode current collector 170. In some implementations, the optional barrier film 160a, 160b (collectively 160) is formed on opposing sides of the anode current collector 170. In some implementations, the optional wetting film 150a, 150b is formed on the optional barrier film 160a, 160b. The anode electrode structure 180 has a low melting temperature metal film 140a, 140b formed on the optional wetting film 150a, 150b. As discussed herein, in some implementations, the low melting temperature metal film 140a, 140b is formed directly on the anode current collector 170. Although anode electrode structure 180 is a dual-sided electrode structure, the implementations described herein are also applicable to single sided electrode structures.

In some implementations, a protective film 190a, 190b (collectively 190) is formed on the low melting temperature metal film 140a, 140b. The protective film 190a, 190b may be an interleaf film or ion-conducting polymer. In some implementations where protective film 190a, 190b is an interleaf film, the interleaf film is typically removed prior to combining the anode electrode structure 180 with a cathode structure to form an energy storage device (e.g., a lithium-ion storage device or capacitor). In some implementations where protective film 190a, 190b is an ion-conducting polymer film, the ion-conducting polymer film may be incorporated into the final energy storage device structure.

The protective film 190 may be a lithium-ion conducting material. The Li-ion conducting material may be comprised of one or more of UPON, doped variants of either crystalline or amorphous phases of $Li_7La_3Zr_2O_{12}$, doped anti-perovskite compositions, $Li_2S$—$P_2S_5$, $LiioGeP_2S_{12}$, and $Li_3PS_4$, lithium phosphate glasses, $(1-x)LiI-(x)Li_4SnS_4$, $xLiI-(1-x)Li_4SnS_4$, mixed sulfide and oxide electrolytes (crystalline LLZO, amorphous $(1-x)LiI-(x)Li_4SnS_4$ mixture, and amorphous $xLiI-(1-x)Li_4SnS_4$) for example. In one implementation, x is between 0 and 1 (e.g., 0.1, 0.2, 0.3, 0.4, 0.5, 0.6, 0.7, 0.8, and 0.9). The Li-ion conducting material can be directly deposited on the low melting temperature metal film using either a by Physical Vapor Deposition (PVD), Chemical Vapor Deposition (CVD), spray, doctor blade, printing or any of a number of coating methods. A suitable method for some implementations is PVD. In some implementations, the protective film 190 does not need to be ion conducting, however, once filled with electrolyte (liquid, gel, solid, combination etc.), the combination of porous substrate and electrolyte is ion conducting.

The protective film 190 may be an interleaf film. The interleaf film may comprise a thermoplastic, such as a polyethylene, a polypropylene, a poly(ethylene terephthalate), a poly(butylene terephthalate) a polyester, a polyamide, a polyaramid, a polyacrylate, a polycarbonate, a poly(ester carbonate), a polybenzimidazole, a polyimide, a polyether imide, a polyamide imide, and the like.

In one implementation, the anode electrode structure 180 includes low melting temperature metal film 140 formed on the anode current collector 170 (e.g., Li/Cu). In another implementation, the anode electrode structure 180 includes low melting temperature metal film 140/barrier film 160/anode current collector 170 (e.g., Li/Ti/Cu). In yet another implementation, the anode electrode structure 180 includes low melting temperature metal film 140/wetting film 150/barrier film 160/anode current collector 170 (e.g., Li/Si/Ti/Cu). In yet another implementation, the anode electrode structure 180 includes low melting temperature metal film 140/barrier film 160 (e.g., Li/Ti). In yet another implementation, the anode electrode structure 180 includes low melting temperature metal film 140/wetting film 150/barrier film 160 (e.g., Li/Si/Ti).

An anode structure may be fabricated using tools of the present disclosure as described herein. According to some implementations, a web tool for forming anode structures comprises a reel-to-reel system for transporting a substrate or current collector through the following chambers: an optional chamber for depositing a barrier film on the substrate, an optional chamber for depositing a wetting film on the barrier film, a lithium metal printer for depositing a low melting temperature metal film (e.g., lithium) on the wetting film if present, or directly on the barrier film or substrate, and optionally a chamber for depositing a protective film on the low melting temperature metal film. The chamber for depositing the thin film of lithium is a chamber configured for lithium printing.

In some implementations, the tool may further comprise a chamber for surface modification, such as a plasma pretreatment chamber, of the continuous sheet of material prior to deposition on the continuous sheet of material. Further, in some implementations the tool may further comprise a chamber for depositing a binder soluble in a liquid electrolyte or a Li-ion-conducting dielectric material.

Figure 2:
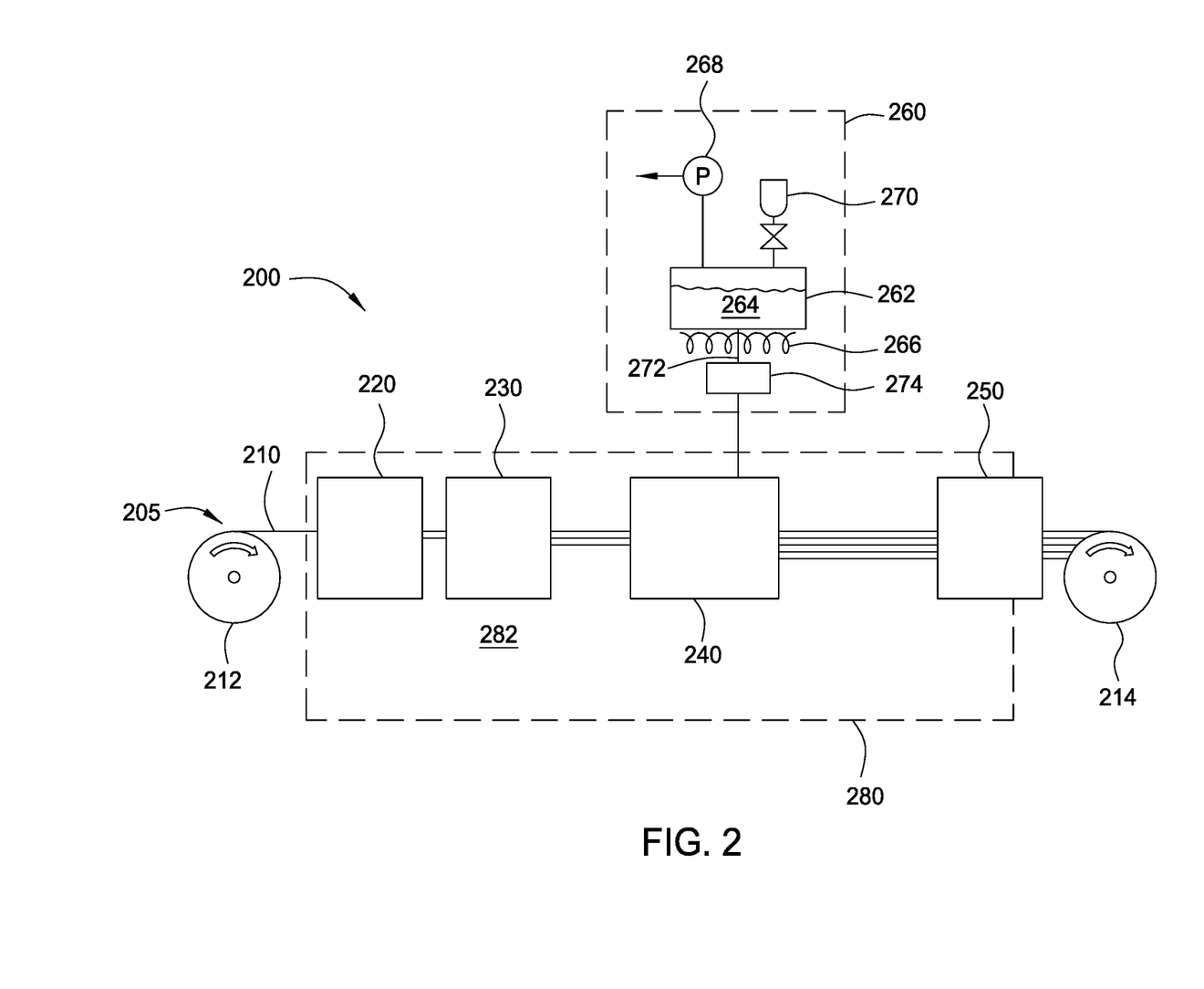
FIG. 2 illustrates a schematic view of an integrated processing tool for forming an anode electrode structure according to implementations described herein.

FIG. 2 illustrates a schematic view of an integrated processing tool 200 for forming an electrode structure according to implementations described herein. The integrated processing tool 200 may be used to form an anode structure having a printed low melting temperature metal film (e.g., lithium) formed according to implementations described herein. In certain implementations, the integrated processing tool 200 comprises a plurality of processing modules or chambers arranged in a line, each configured to perform one processing operation to a continuous sheet of material 210. In one implementation, the integrated processing tool 200 is a web tool. In one implementation, the continuous sheet of material 210 is cathode current collector 110. The integrated processing tool 200 may comprise reels 212 and 214 for moving the continuous sheet of material 210 through the plurality of processing chamber or modules. In one implementation, the integrated processing tool 200 includes a first processing chamber 220 for depositing a barrier film over the continuous sheet of material 210, a second processing chamber 230 for depositing a wetting film over the continuous sheet of material 210, a third processing chamber 240 for printing a low melting temperature metal film over the continuous sheet of material 210, and a fourth processing chamber 250 for depositing a protective film over the low melting temperature metal film.

In one implementation, the processing chambers 220, 230, 240 and 250 are stand-alone modular processing chambers wherein each modular processing chamber is structurally separated from the other modular processing chambers. Therefore, each of the stand-alone modular processing chambers, can be arranged, rearranged, replaced, or maintained independently without affecting each other. In certain implementations, the processing chambers 220, 230, 240 and 250 are configured to process both sides of the continuous sheet of material 210. Although the integrated processing tool 200 is configured to process a horizontally oriented continuous sheet of material 210, the integrated processing tool 200 may be configured to process substrates positioned in different orientations, for example, a vertically oriented continuous sheet of material 210. In certain implementations, the continuous sheet of material 210 is a conductive substrate. In certain implementations, the continuous sheet of material 210 is a flexible conductive substrate.

In certain implementations, the integrated processing tool 200 comprises a transfer mechanism 205. The transfer mechanism 205 may comprise any transfer mechanism capable of moving the continuous sheet of material 210 through the processing region of the processing chambers 220 and 230. The transfer mechanism 205 may comprise common transport architecture. The common transport architecture may comprise a reel-to-reel system with a common take-up-reel 214 and a feed reel 212 for the system. The take-up reel 214 and the feed reel 212 may be individually heated. The take-up reel 214 and the feed reel 212 may be individually heated using an internal heat source positioned within each reel or an external heat source. The common transport architecture may further comprise one or more intermediate transfer reels (not shown) positioned between the take-up reel 214 and the feed reel 212.

Although the integrated processing tool 200 is depicted as having discrete processing regions, in some implementations, the integrated processing tool 200 has a common processing region. In some implementation, it may be advantageous to have separate or discrete processing regions, modules, or chambers for each process step. For implementations having discrete processing regions, modules, or chambers, the common transport architecture may be a reel-to-reel system where each chamber or processing region has an individual take-up-reel and feed reel and one or more optional intermediate transfer reels positioned between the take-up reel and the feed reel. The common transport architecture may comprise a track system. The track system extends through the processing regions or discrete processing regions. The track system is configured to transport either a web substrate or discrete substrates. In some implementations, the finished anode electrode will not be collected on take-up reel 214 as shown in the figures, but may go directly for integration with the separator film and positive electrodes, etc., to form battery cells.

The first processing chamber 220 is configured for depositing a barrier film on the continuous sheet of material 210. In one implementation, the barrier film is barrier film 160. As discussed herein, in some implementations, the barrier film is optional and thus the first processing chamber 220 is also an optional component of the integrated processing tool 200. Any suitable barrier film deposition process for depositing barrier films may be used to deposit the barrier film. The first processing chamber 220 for depositing the barrier film may include a PVD system, such as an electron-beam evaporator, a thermal evaporation system, or a sputtering system, a thin film transfer system, or a slot-die deposition system.

The second processing chamber 230 is configured for depositing a wetting film over the continuous sheet of material 210. In one implementation, the wetting film is deposited on the barrier film. If the barrier film is not present, the wetting film is deposited directly on the continuous sheet of material 210. In one implementation, the wetting film is wetting film 150. As discussed herein, in some implementations, the wetting film is optional and thus the second processing chamber 230 is an optional component of the integrated processing tool 200. Any suitable wetting film deposition process for depositing wetting films may be used to deposit the wetting film. The second processing chamber 230 for depositing the wetting film may include a PVD system, such as an electron-beam evaporator, a thermal evaporation system, or a sputtering system, a thin film transfer system, or a slot-die deposition system.

The third processing chamber 240 is configured for depositing a thin film of low melting temperature metal (e.g., lithium) over the continuous sheet of material 210. In one implementation, the low melting temperature metal film is deposited on the wetting film or barrier film. If the barrier film and/or wetting film are not present, the low melting temperature metal film is deposited directly on the continuous sheet of material 210. In one implementation, the low melting temperature metal film is low melting temperature metal film 140. Any suitable metal film deposition process for depositing low melting temperature metal may be used to deposit the low melting temperature metal film. The third processing chamber 240 for depositing the low melting temperature metal film may include a three-dimensional printing system (e.g., a three-dimensional screen printing system), a PVD system, such as an electron-beam evaporator, a thermal evaporation system, or a sputtering system, a thin film transfer system, or a slot-die deposition system.

In one implementation, a low melting temperature metal purification module 260 is coupled with the third processing chamber 240 for supplying purified low melting temperature metal to the third processing chamber 240. The low melting temperature metal purification module 260 includes a tank 262 containing a low melting temperature metal source 264. In one implementation, the tank 262 includes a heating source 266 for melting the low melting temperature metal source 264 to form molten metal. In one implementation, a pump 268 evacuates air from the tank 262, which may be replaced by an inert gas from gas supply 270 to provide a controlled non-reactive environment for the molten metal within the tank 262. A conduit 272 conveys the molten metal from the tank 262 to a filter assembly 274 for removing contaminants from the molten metal. Alternatively, vacuum atmosphere can be used to purify lithium metal.

The filter assembly 274 comprises any design and/or material suitable for removal of unwanted quantities of solid and gaseous contaminants (e.g., lithium nitrides and lithium oxides) from the molten lithium. In one implementation, the filter assembly 274 includes a skimmer device for removing solid contaminants from the surface of the molten metal.

In one implementation, the filter assembly 274 includes a metal mesh filter for removing solid contaminants from the molten metal. The metal mesh filter may comprise any material compatible with molten metal. In one implementation, the metal mesh is composed of a material selected form copper, aluminum, nickel, or combinations thereof. In one implementation, the metal mesh filter is composed of stainless steel (SST). In one implementations, the metal mesh filter is composed of copper, aluminum, nickel, stainless steel, or combinations thereof. The dimensions of the metal mesh filter are typically selected based on the size of the solid contaminants to be filtered out of the molten metal. The metal mesh filter may have a wire diameter between about 0.050 micrometers and about 200 micrometers. The metal mesh filter may have a wire diameter between about 50 micrometers and about 100 micrometers. In one implementation, the metal mesh filter may have an opening between about 5 micrometers and about 200 micrometers. In one implementation, the metal mesh filter may have an opening between about 10 micrometers and about 100 micrometers. As used herein with reference to the metal mesh filter, the term "openings" refers to the distance between two adjacent parallel wires.

In one implementation, the filter assembly 274 includes a foam filter for removing solid contaminants from the molten metal. The foam filter may comprise any material compatible with the molten metal. In one implementation, the foam filter is composed of a material selected form copper, copper-zinc, aluminum, nickel, stainless steel, or combinations thereof. In one implementation, the foam filter is composed of reticulated foam material. The dimensions of the cells and porosity of the foam material is selected to remove the solid contaminants from the molten metal while allowing the purified molten metal to flow through the foam material.

Any suitable metal deposition process for depositing thin films of low melting temperature metal may be used to deposit the thin film of metal. Deposition of the thin film of metal may be by PVD processes, such as evaporation or sputtering, a slot-die process, a transfer process, a three-dimensional printing process, or other suitable coating processes. The chamber for depositing the thin film of metal may include a PVD system, such as an electron-beam evaporator, a thermal evaporation system, or a sputtering system, a thin film transfer system, or a slot-die deposition system.

The fourth processing chamber 250 is configured for depositing a protective film on the metal film. In one implementation, the protective film is protective film 190. In one implementation, the protective film is an ion-conducting material. In one implementation, the protective film is a lithium ion-conducting material. In one implementation, the protective film is an interleaf film. The interleaf film may comprise a thermoplastic, such as a polyethylene, a polypropylene, a poly(ethylene terephthalate), a poly(butylene terephthalate), a polyester, a polyamide, a polyaramid, a polyacrylate, a polycarbonate, a poly(ester carbonate), a polybenzimidazole, a polyimide, a polyether imide, a polyamide imide, and the like. Any suitable application or deposition process may be used to deposit the protective film. The protective film can be formed by dip-coating, slot-die coating, gravure coating, or printing.

The area 280 defines a common processing region 282, which indicates a portion of the integrated processing tool 200 that may be under a controlled environment. In one implementation, the common processing region 282 remains under vacuum and/or at a pressure below atmosphere during processing. The vacuum level of the common processing region 282 may be adjusted to match the vacuum level of the processing regions of each processing chamber 220-250. In one implementation, the common processing region 282 remains at atmospheric pressure during processing. In one implementation, the common processing region 282 remains under an inert gas atmosphere during processing. In one implementation, the inert gas atmosphere is an argon gas atmosphere. In one implementation, the inert gas atmosphere is a nitrogen gas ($N_2$) atmosphere.

Additional chambers may be included in the integrated processing tool 200. In some implementations, additional chambers may provide for deposition of a separator, an electrolyte soluble binder, or in some implementations, additional chambers may provide for formation of a positive electrode. In some implementations, additional chambers provide for cutting of the negative electrode.

Figure 3:
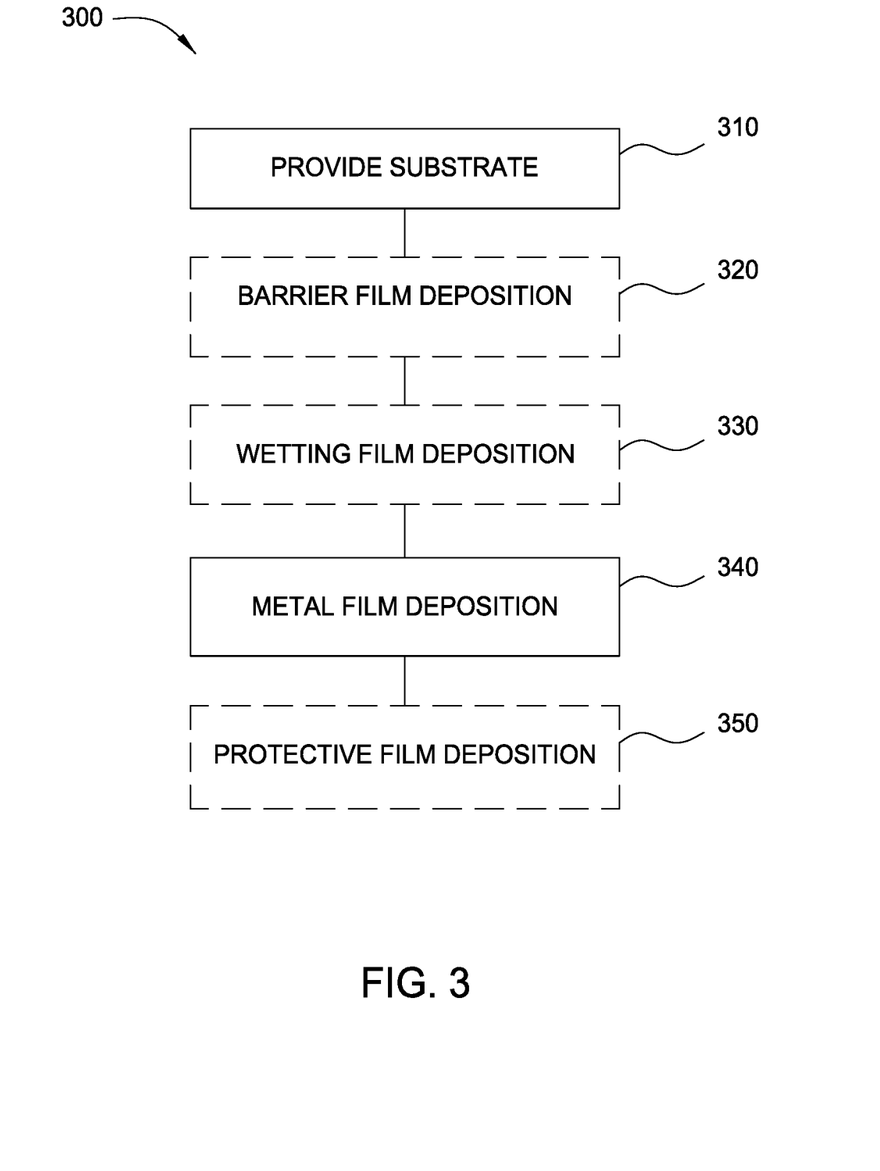
FIG. 3 illustrates a process flow chart summarizing one implementation of a method for forming an anode electrode structure according to implementations described herein.

FIG. 3 illustrates a process flow chart summarizing one implementation of a method 300 for forming a structure (e.g., an electrode structure or a printed circuit) according to implementations described herein. At operation 310, a substrate is provided. The substrate may be continuous sheet of material 210. The substrate may be separator film 130. Optionally, at operation 320, a barrier film is formed on the substrate. The barrier film may be barrier film 160. The barrier film may be formed in the first processing chamber 220. Optionally, at operation 330 a wetting film is formed over the substrate. The wetting film may be wetting film 150. In some implementations, where the barrier film is present, the wetting film is formed on the barrier film. In some implementations, the wetting film is formed directly on the substrate. The wetting film may be formed in the second processing chamber 230.

At operation 340, a metal film is formed from a low melting temperature metal. The metal film may be low melting temperature metal film 140. The metal film may be an alkali metal film for an electrode structure. The metal film may be a lithium metal film for an electrode structure. If a wetting layer is present, the metal film is formed on the wetting layer. If the wetting layer is not present, the metal film may be formed either directly on the substrate or on the barrier film if present. The metal film may be formed in the third processing chamber 240. The metal film may be deposited via a 3D printing system (e.g., a three-dimensional screen printing system), a PVD system, such as an electron-beam evaporator, a thermal evaporation system, or a sputtering system, a thin film transfer system, a slot-die deposition system, a painting process, or other suitable coating processes.

In one implementation, the metal source is exposed to a heating source to form molten metal. The molten metal may be stored in a controlled non-reactive environment (e.g., an inert gas). In some implementations, the molten metal is exposed to a purification process to remove unwanted quantities of solid and/or gaseous contaminants (e.g., lithium nitrides and lithium oxides) from the molten metal prior to deposition to form the metal film. In one implementation, the molten metal is delivered to a filter assembly for removing contaminants from the molten metal. The filter assembly may comprise any design and/or material suitable for removal of unwanted quantities of solid and gaseous contaminants (e.g., lithium nitrides and lithium oxides) from the molten metal. In one implementation, the filter assembly includes a skimmer device for removing solid contaminants from the surface of the molten metal. In one implementation, the filter assembly includes a metal mesh filter for removing solid contaminants from the molten metal. The metal mesh filter may comprise any material compatible with the molten metal. In one implementation, the metal mesh is composed of a material selected form copper, nickel, stainless steel, tungsten, molybdenum, or combinations thereof. In one implementation, the metal mesh filter is composed of stainless steel (SST). In one implementation, the filter assembly includes a foam filter for removing solid contaminants from the molten metal. The foam filter may comprise any material compatible with molten metal. In one implementation, the foam filter is composed of a material selected form copper, copper-zinc, aluminum, nickel, stainless steel, or combinations thereof. Lithium metal can also be evaporated, distilled in vacuum to remove contaminants dissolved in lithium.

At operation 350, a protective film is formed on the metal film. The protective film may be protective film 190. The protective film may be formed in the fourth processing chamber 250. The substrate with the metal film and the protective film may optionally be stored, transferred to another tool, or both. The substrate with the metal film and the protective film formed thereon may be subject to additional processing.

In some implementations, the substrate surfaces contain contaminants that prevent good wetting or bonding of deposited materials. In such cases, proper surface treatment is needed before depositing the material. Deposition of a thin bonding layer on top of surface contaminated may help enhance good quality deposition. Alternatively, preferred wetting of substrates can be manipulated for roll-to-roll pattern coating/printing or painting. For example, oil pattern, laser etching, reactive plasma treatment will help create patterns in the roll-to-roll substrate to manipulate pattern coating, printing or painting techniques.

Although implementations of the present disclosure have been particularly described with reference to lithium-ion batteries with lithium metal-based electrodes, the teaching and principles of the present disclosure may be applicable to other capacitors and lithium-based batteries such as Li-polymer, Li—S, Li—FeS$_2$, Li metal based batteries, etc. For the Li metal-based batteries such as Li—S and Li—FeS$_2$ a thicker Li metal electrode may be needed and the thickness of Li metal depends on the positive electrode loading. In some implementations the Li metal electrode may be between 3 and 30 microns thick for Li—S and roughly 190-200 microns for Li—FeS$_2$, and may be deposited on one or both sides of a compatible substrate such as a Cu or stainless steel metal foil—the methods and tools described herein may be used to fabricate such Li metal electrodes.

In summary, some of the benefits of the present disclosure include the direct printing of metal features, which can help in packaging of sensors. It has been found by the inventors that direct printing of metal features using the implementations described herein reduces pore formation between metal particles and enhances electronic conductivity. It is further believed that direct printing of metal and/or metal alloy features from low temperature metals or alloys using the implementations described herein significantly improves the quality of the circuit. According to the implementations described herein, the direct deposition of low melting metal or alloys can be done either in vacuum conditions or suitable atmospheric ambient.

When introducing elements of the present disclosure or exemplary aspects or implementation(s) thereof, the articles "a," "an," "the" and "said" are intended to mean that there are one or more of the elements.

The terms "comprising," "including" and "having" are intended to be inclusive and mean that there may be additional elements other than the listed elements.

While the foregoing is directed to implementations of the present disclosure, other and further implementations of the disclosure may be devised without departing from the basic scope thereof, and the scope thereof is determined by the claims that follow.

The invention claimed is:

1. A method of forming an anode electrode structure, comprising:
  exposing a molten metal source to a purification process to remove unwanted quantities of contaminants, comprising:
    delivering a molten metal from the molten metal source to a filter assembly, wherein the filter assembly comprises at least one of a skimmer device, a metal mesh filter, and a foam filter; and
    filtering the molten metal through the filter assembly to form a filtered molten metal;
  delivering the filtered molten metal to a three dimensional printing device; and
  forming a metal film on a substrate by printing the filtered molten metal on the substrate, wherein the substrate is at least one of a polymeric separator film or a conductive current collector.

2. The method of claim 1, wherein the molten metal has a melting temperature of 1,000 degrees Celsius or less.

3. The method of claim 2, wherein the molten metal has a melting temperature of 800 degrees Celsius or less.

4. The method of claim 3, wherein the molten metal has a melting temperature of 700 degrees Celsius or less.

5. The method of claim 1, wherein the molten metal is selected from the group consisting of alkali metal, magnesium, zinc, cadmium, aluminum, gallium, indium, thallium, tin, lead, antimony, bismuth, tellurium, alkali earth metals, silver, and combinations thereof.

6. The method of claim 5, wherein the metal mesh filter is composed of copper, aluminum, nickel, stainless steel, or combinations thereof.

7. The method of claim 6, wherein the foam filter is composed of copper, copper-zinc, aluminum, nickel, stainless steel, or combinations thereof.

8. A method of forming an anode electrode structure, comprising:
  exposing a molten lithium source to a purification process to remove unwanted quantities of contaminants, comprising:

delivering a molten lithium from the molten lithium source to a filter assembly, wherein the filter assembly comprises a skimmer device, a metal mesh filter, or a foam filter; and filtering the molten lithium through the filter assembly to form a filtered molten lithium;

delivering the filtered molten lithium to a three dimensional printing device; and forming a lithium metal film on a substrate by printing the filtered molten lithium on the substrate, wherein the substrate is at least one of a polymeric separator film or a conductive current collector.

9. The method of claim 8, wherein the metal mesh filter is composed of copper, aluminum, nickel, stainless steel, or combinations thereof.

10. The method of claim 8, wherein the foam filter is composed of copper, copper-zinc, aluminum, nickel, stainless steel, or combinations thereof.

11. The method of claim 8, wherein the substrate is the conductive current collector and the conductive current collector is copper.

12. The method of claim 8, wherein the substrate is the polymeric separator film and the polymeric separator film comprises a microporous polymeric substrate capable of conducting ions.

13. The method of claim 8, wherein the lithium metal film has a thickness from about 5 micrometers to about 20 micrometers.

14. A method of forming an anode electrode structure, comprising:

forming a barrier film on a conductive current collector, wherein the barrier film is selected from titanium (Ti), molybdenum (Mo), tungsten (W), zirconium (Zr), hafnium (Hf), niobium (Nb), tantalum (Ta) and combinations thereof;

forming a wetting film on the barrier film, wherein the wetting film is selected from silicon (Si), tin (Sn), aluminum (Al), germanium (Ge), antimony (Sb), lead (Pb), bismuth (Bi), gallium (Ga), indium (In), zinc (Zn), cadmium (Cd), magnesium (Mg), oxides thereof, nitrides thereof, or combinations thereof; and exposing molten lithium to a purification process to remove unwanted quantities of contaminants and form a purified molten lithium;

delivering the purified molten lithium to a three dimensional printing device; and forming a lithium metal film on the wetting film by printing the purified molten lithium on the wetting film.

15. The method of claim 14, further comprising forming a protective film on the lithium metal film, wherein the protective film is a lithium ion-conducting material or an interleaf film.

16. The method of claim 14, wherein the conductive current collector is copper.

17. The method claim 14, wherein the lithium metal film has a thickness from about 5 micrometers to about 20 micrometers.

18. The method of claim 14, wherein the purification process comprises:

delivering the molten lithium to a filter assembly, wherein the filter assembly comprises a skimmer device, a metal mesh filter, or a foam filter; and filtering the molten lithium through the filter assembly to purify the molten lithium.

19. The method of claim 18, wherein the metal mesh filter is composed of copper, aluminum, nickel, stainless steel, or combinations thereof.

20. The method of claim 19, wherein the foam filter is composed of copper, copper-zinc, aluminum, nickel, stainless steel, or combinations thereof.

* * * * *